(12) United States Patent
Bergholz et al.

(10) Patent No.: US 7,882,119 B2
(45) Date of Patent: Feb. 1, 2011

(54) DOCUMENT ALIGNMENT SYSTEMS FOR LEGACY DOCUMENT CONVERSIONS

(75) Inventors: Andre Bergholz, Grenoble (FR); Boris Chidlovskii, Meylan (FR)

(73) Assignee: Xerox Corporation, Norwalk, CT (US)

( * ) Notice: Subject to any disclaimer, the term of this patent is extended or adjusted under 35 U.S.C. 154(b) by 1039 days.

(21) Appl. No.: 11/315,458

(22) Filed: Dec. 22, 2005

(65) Prior Publication Data

US 2007/0150443 A1 Jun. 28, 2007

(51) Int. Cl.
G06F 7/00 (2006.01)
G06F 17/30 (2006.01)
(52) U.S. Cl. .................. 707/758; 707/780; 706/1; 706/8; 706/9
(58) Field of Classification Search ............. 707/2, 707/102, 103 Y, 103 R; 715/234, 236, 237, 715/239
See application file for complete search history.

(56) References Cited

U.S. PATENT DOCUMENTS

| 5,491,628 | A | 2/1996 | Wakayama et al. |
| 5,915,259 | A | 6/1999 | Murata |
| 5,920,879 | A | 7/1999 | Kyojima et al. |
| 5,970,490 | A | 10/1999 | Morgenstern |
| 6,377,945 | B1 | 4/2002 | Risvik |
| 6,480,865 | B1 | 11/2002 | Lee et al. |
| 6,487,566 | B1 | 11/2002 | Sundaresan |
| 6,569,207 | B1 | 5/2003 | Sundaresan |
| 6,826,568 | B2 * | 11/2004 | Bernstein et al. ............... 707/6 |
| 6,845,380 | B2 * | 1/2005 | Su et al. ..................... 707/102 |
| 6,950,815 | B2 | 9/2005 | Tijare et al. |
| 2002/0003547 | A1 * | 1/2002 | Wang et al. ................. 345/727 |
| 2002/0007379 | A1 * | 1/2002 | Wang et al. ................. 707/515 |
| 2005/0039117 | A1 * | 2/2005 | Lwo .......................... 715/513 |
| 2005/0154979 | A1 | 7/2005 | Chidlovskii et al. |

OTHER PUBLICATIONS

Costa, Gianni et al. "A Tree-Based Approach to Clustering XML Documents by Structure," Knowledge Discovery in Databases: PKDD 2004, Springer Berlin/Heidelberg 2004, vol. 3202/2004, ISBN 978-3-540-23108-0, pp. 137-148.*

(Continued)

*Primary Examiner*—Mohammad Ali
*Assistant Examiner*—Angelica Ruiz
(74) *Attorney, Agent, or Firm*—Fay Sharpe LLP

(57) ABSTRACT

A method for aligning documents which may be in different XML formats includes inputting source and target leaves of a source and documents in first and second tree structured formats and assigning a cost to each of a plurality of matches. Each match may include a source leaf and a target leaf or be an unmatched source or target leaf. Matches are identified for which a total cost is minimal, wherein each of the leaves is in at least one of the identified matches. From the identified matches, groups of two or more matches are identified which have a leaf in common. From the groups, probable matches are identified in which more that one target leaf is matched with at least one source leaf or more than one source leaf is matched with a target leaf. An alignment between leaves of the target document and leaves of the source document is output which includes the probable matches.

26 Claims, 9 Drawing Sheets

OTHER PUBLICATIONS

P. Bille, "Tree Edit Distance, Alignment Distance and Inclusion", Technical Report TR-2003-23, The IT University of Copenhagen, Copenhagen, Denmark, 2003.

P. F. Brown, J. C. Lai, R. L. Mercer, "Aligning Sentences in Parallel Corpora" Proceedings of the Annual Meeting of the Association for Computional Linguistics (ACL), pp. 169-176, Berkeley, CA (Jun. 1991).

S. Chapman, "String Similarity Metrics for Information Integration"; http://www.dcs.shef.ac.uk/~sam/stringmetrics.html, Dec. 22, 2005.

I. Dagan, K. W. Church, W. A. Gale, "Robust Bilingual Word Alignment for Machine Aided Translation" Proceedings of the Workshop on Very Large Corpora, pp. 1-8, Columbus, OH (Jun. 1993).

D. Mekhaldi, D. Lalanne, R. Ingold, "Using Bi-modal Alignment and Clustering Techniques for Documents and Speech Thematic Segmentations", CIKM '04, Nov. 8-13, 2004, Washington, DC. pp. 69-77.

I. D. Melamed, "Bitext Maps and Alignment via Pattern Recognition", Computational Linguistics, 25(1):107-130 (1999).

A. E. Monge and C. Elkan, "The Field Matching Problem: Algorithms and Applications", Proceedings of the ACM SIGKDD International Conference on Knowledge Discovery and Data Mining, pp. 267-270, Portland, Oregon (Aug. 1996).

U.S. Appl. No, 10/986,490, filed Nov. 10, 2004, B. Chidlovskii.
U.S. Appl. No. 11/032,814, filed Jan. 10, 2005, H. Dejean, et al.
U.S. Appl. No. 11/032,817, filed Jan. 10, 2005, H. Dejean, et al.
U.S. Appl. No. 11/116,100, Apr. 27, 2005, A. Bergholz.
U.S. Appl. No. 11/137,566, filed May 26, 2005, J.L. Meunier.
U.S. Appl. No. 11/156,776, filed Jun. 20, 2005, B. Chidlovskii, et al.
U.S. Appl. No. 11/170,542, filed Jun. 29, 2005, B. Chidlovskii, et al.
U.S. Appl. No. 11/222,881, filed Sep. 9, 2005, A. Bergholz.

* cited by examiner

|     | t1   | t2   | t3   | t4   | t5   | t6   |
| --- | ---- | ---- | ---- | ---- | ---- | ---- |
| s1  | 1.0  | 1.0  | 1.0  | 1.0  | 1.0  | 1.0  |
| s2  | 0.13 | 1.0  | 1.0  | 1.0  | 1.0  | 1.0  |
| s3  | 0.23 | 1.0  | 1.0  | 1.0  | 1.0  | 1.0  |
| s4  | 1.0  | 0.28 | 0.25 | 1.0  | 1.0  | 1.0  |
| s5  | 1.0  | 1.0  | 1.0  | 0.18 | 0.26 | 1.0  |
| s6  | 1.0  | 1.0  | 1.0  | 1.0  | 1.0  | 0.43 |

FIG. 6

|    | t1   | t2   | t3   | t4   | t5   | t6   |
|----|------|------|------|------|------|------|
|    | 0.0  | 1.0  | 2.0  | 3.0  | 4.0  | 5.0  | 6.0 |
| s1 | 1.0  | 1.0  | 2.0  | 3.0  | 4.0  | 5.0  | 6.0 |
| s2 | 2.0  | 1.13 | 2.0  | 3.0  | 4.0  | 5.0  | 6.0 |
| s3 | 3.0  | 1.38 | 2.13 | 3.0  | 4.0  | 5.0  | 6.0 |
| s4 | 4.0  | 2.38 | 1.84 | 1.89 | 2.89 | 3.89 | 4.89 |
| s5 | 5.0  | 3.38 | 2.84 | 2.84 | 2.08 | 2.32 | 2.32 |
| s6 | 6.0  | 4.38 | 3.84 | 3.84 | 3.08 | 3.08 | 2.76 |

....
<text emphasis-bold="true" font="Helvetica" font-color="#000000"
font-size="11" height="16.0" width="36.0" x="270.0" y="222.0"><NONE>
    Title
</text>
<text font="Helvetica" font-color="#000000" font-size="10"
height="13.0" width="228.0" x="270.0" y="255.0"><t1>
    "Computers and Intractability: A Guide to the Theory"
</text>
<text font="Helvetica" font-color="#000000" font-size="10"
height="13.0" width="84.0" x="270.0" y="269.0"><t1>
    of NP-Completeness"
</text>
<text font="Helvetica" font-color="#000000" font-size="10"
height="13.0" width="149.0" x="270.0" y="283.0"><t2,t3>
    by Garey, M.R. and Johnson, D.S.
</text>
<text font="Helvetica" font-color="#000000" font-size="10"
height="13.0" width="223.0" x="270.0" y="297.0"><t4,t5>
    Publisher: W.H. Freeman and Company, New York, USA
</text> <text font="Helvetica" font-color="#000000" font-size="10"
height="13.0" width="18.0" x="270.0" y="311.0"><t6>
    1979
</text>
....

```

10

140

```
<book>
<title> Computers and
Intractability: A Guide to the
Theory of NP-Completeness
</title>
<author> Garey, M.R. <author>
<author> Johnson, D.S.
</author>
<publisher> W.H. Freeman and
Company </publisher>
<address> New York, USA
</address>
<year> 1979 </year>
</book>
```

DOCUMENT ALIGNMENT SYSTEMS FOR LEGACY DOCUMENT CONVERSIONS

CROSS REFERENCE TO RELATED PATENTS AND APPLICATIONS

The following copending applications, the disclosures of which are incorporated herein in their entireties by reference, are mentioned:

U.S. application Ser. No. 11/222,881, filed Sep. 9, 2005, entitled "METHOD FOR DOCUMENT CLUSTERING BASED ON PAGE LAYOUT ATTRIBUTES," by André Bergholz.

U.S. application Ser. No. 11/137,566, filed May 26, 2005, entitled "METHOD AND APPARATUS FOR DETERMINING LOGICAL DOCUMENT STRUCTURE," by Jean-Luc Meunier.

U.S. application Ser. No. 10/986,490, filed Nov. 10, 2004, entitled "SYSTEM AND METHOD FOR TRANSFORMING LEGACY DOCUMENTS INTO XML DOCUMENTS," by Boris Chidlovskii.

U.S. application Ser. No. 11/170,542, filed Jun. 29, 2005, entitled "A PROBABILISTIC LEARNING METHOD FOR XML ANNOTATION OF DOCUMENTS," by Boris Chidlovskii, et al.

U.S. application Ser. No. 11/156,776, filed Jun. 20, 2005, entitled "A METHOD FOR CLASSIFYING SUB-TREES IN SEMI-STRUCTURED DOCUMENTS," by Boris Chidlovskii, et al.

U.S. application Ser. No. 11/116,100, filed Apr. 27, 2005, entitled "METHOD FOR STRUCTURING DOCUMENTS BASED ON THEIR TOC," by Hervé Déjean, et al.

U.S. application Ser. No. 11/032,817, filed Jan. 10, 2005, entitled "GLOBAL APPROACH FOR DETECTING PAGINATION CONSTRUCTS IN A DOCUMENT," by Hervé Déjean, et al.

U.S. application Ser. No. 11/032,814, filed Jan. 10, 2005, entitled "VERSATILE DETECTION OF A TABLE OF CONTENTS AND REFERENCE DETERMINATION," by Hervé Déjean, et al.

BACKGROUND

The present invention is directed to the field of electronic document format conversion. It finds particular application in the alignment of pairs of documents in different extended markup language (XML) formats, and will be described with reference thereto, although it is to be appreciated that the method is also applicable to the alignment of documents in other formats.

Some of the benefits of electronic documents over paper documents include enhanced document processing capabilities and easier manipulation of documents, such as creation, editing, updating, storage, access, and delivery of documents. A key enabler for such enhancement in known systems is their ability to represent not only the contents of documents but also various meta-information about the contents. For instance, document structures, such as chapter, section, and paragraph breaks can be explicitly represented for enhanced browsing, retrieval, and component reuse.

Companies and organizations that own data and documents in electronic form frequently face a problem of migrating legacy documents, often in proprietary formats, into new document formats that allow performance of such operations in a most cost effective and efficient manner. This efficiency is obtained by sharing meta-information in the document. A standard formalism for encoding this meta-information and data exchange is extendable mark-up language (XML). The conversion process has two main steps. The first main step involves design of a rich and highly structured document model. The second main step involves conversion of the legacy documents into the new document model. The conversion process not only transforms legacy documents from an existing format into a new one, such as, for example, from Microsoft Word™ into extended mark-up language, but also customizes information which is not explicitly encoded in the legacy documents.

For Microsoft Word™ documents, for example, several conversion solutions exist. These conversion solutions use a proprietary model to save the document content along with all structural, layout and mark-up instructions. Although the document content is converted into a standard structure format, this solution is often insufficient from a user's point of view, as it addresses not the document content with associated semantics, but instead addresses how the document content is to be visualized. As a result, the document structural tags are mark-up and/or layout orientated.

Schemas describe what types of nodes may appear in documents and which hierarchical relationships such nodes may have. A schema is typically represented by an extended context-free grammar. A tree is an instance of this schema if it is a parse tree of that grammar. In this regard, it should be noted that an extended markup language (XML) schema specifies constraints on the structures and types of elements in an XML document. The basic schema for XML is the DTD (Document Type Definition). Other XML schema definitions are also being developed, such as DCD (Document Content Definition), XSchema, etc. DTD uses a different syntax from XML, while DCD and XSchema specify an XML schema language in XML itself. They all describe XML Schema. This means that they assume the common XML structure and provide a description language to say how the elements are laid out and are related to each other.

An important part of developing a system for automated conversion of documents from one format to another is the automatic learning of document transformations. During the supervised learning process, the leaves of the tree-structured source document are assigned target classes, which are obtained from given sample target documents. For the learning process it is important that a correspondence between the leaves of the source document and the leaves of the sample target document is established. This enables the learning method to assign a target class to the leaves in the source document. A suitable training set can thus only be constructed if it is known which target leaves correspond to which source leaves.

INCORPORATION BY REFERENCE

The following references, the disclosures of which are incorporated herein in their entireties by reference, are mentioned:

U.S. Published Application Serial No. 20050154979, published Jul. 14, 2005, by Chidlovskii, et al. entitled "SYSTEMS AND METHODS FOR CONVERTING LEGACY AND PROPRIETARY DOCUMENTS INTO EXTENDED MARK-UP LANGUAGE FORMAT" discloses a system and method that converts legacy and proprietary documents into extended mark-up language format. The system treats the conversion as transforming ordered trees of one schema into ordered trees of another schema. In embodiments, the tree transformers are coded using a learning method that decomposes the converting task into three components which include path re-labeling, structural composition and input tree traversal, each of which involves learning approaches. The transformation of an input tree into an output tree may involve labeling components in the input tree with valid labels or paths from a particular output schema, composing the labeled elements into the output tree with a valid structure, and finding such a traversal of the input tree that achieves the correct composition of the output tree and applies structural rules.

U.S. Pat. No. 6,950,815 entitled "CONTENT MANAGEMENT SYSTEM AND METHODOLOGY FEATURING QUERY CONVERSION CAPABILITY FOR EFFICIENT SEARCHING" by Tijare, et al., describes a content management system which employs a hierarchical item type tree-based structure including tables at different levels to store metadata for items. Metadata is stored in a tree hierarchy of tables in a storage repository using a first data format. The metadata is accessed and a view of the accessed metadata is created in a second data format. The second format is compatible with a query language, such as XML.

U.S. Pat. No. 6,377,945 entitled "SEARCH SYSTEM AND METHOD FOR RETRIEVAL OF DATA, AND THE USE THEREOF IN A SEARCH ENGINE," by Risvik discloses a search system for information retrieval which includes a data structure in the form of a non-evenly spaced sparse suffix tree for storing suffixes of words and/or symbols, or sequences thereof, in a text T, a metric M including combined edit distance metrics for an approximate degree of matching respectively between words and/or symbols, or between sequences thereof, in the text T and a query Q, the latter distance metric including weighting cost functions for edit operations which transform a sequence S of the text into a sequence P of the query Q, and search algorithms for determining the degree of matching respectively between words and/or symbols, or between sequences thereof, in respectively the text T and the query Q, such that information R is retrieved with a specified degree of matching with the query Q. Optionally the search system also includes algorithms for determining exact matching such that information R may be retrieved with an exact degree of matching with the query Q.

U.S. Pat. No. 5,491,628, entitled "METHOD AND APPARATUS FOR DOCUMENT TRANSFORMATION BASED ON ATTRIBUTE GRAMMARS AND ATTRIBUTE COUPLINGS," by Wakayama, et al. discloses a method and apparatus for converting a first document in a first extended attribute grammar to a second document in a second extended attribute grammar. An extended attribute coupling grammar couples the first and second extended attribute grammars. The first document is converted to a first tree, which is partially copied to a first copy. The first copy is completed by evaluating it's attribute with respect to the extended attribute coupling grammar. The first copy is then a partially attributed tree of the second document. The partially attributed tree is completed to form a second tree based on the second extended attribute grammar. The second tree is then converted to the second document.

BRIEF DESCRIPTION

Aspects of the exemplary embodiment relate to a method and an apparatus for document alignment.

In one aspect, a document alignment method includes inputting source leaves of a source document in first tree structured format and inputting target leaves of a target document in second tree structured format. A cost is assigned to each of a plurality of matches, each match comprising a pair of elements selected from the group consisting of a source leaf and a target leaf, an unmatched source leaf, and an unmatched target leaf. Matches for which a total cost is minimal are identified, wherein each of the leaves is in at least one of the identified matches. From the identified matches, groups of matches wherein each match in the group has a leaf in common are identified. From the groups, probable matches in which more that one target leaf is matched with at least one source leaf and probable matches where more than one source leaf is matched with a target leaf are identified. An alignment between leaves of the target document and leaves of the source document which includes the probable matches is output.

In another aspect, a method of alignment includes inputting a matrix with cost values which are a function of a measure of similarity for the content of pairs of leaves, the pairs of leaves each including a leaf of a source document and a leaf of a target document, each of the leaves including document content. The method further includes computing a minimum edit distance for the matrix based on the input cost values, whereby each leaf from the source document is aligned with a leaf of the target document or with no leaf of the target document and each leaf from the target document is aligned with a leaf of the source document or with no leaf of the source document. From the matrix alignments, candidate matches are identified in which a leaf of at least one of the source and target documents matches a combination of leaves of the other of the source and target documents. The candidate matches are refined to identify probable matches. An alignment of the leaves of the first document with the leaves of the second document is output which includes matches of at least some of the leaves of the first document with at least some of the leaves of the second document.

In another aspect, a document alignment apparatus includes an input device for inputting source leaves of a source document in first tree structured format and inputting target leaves of a target document in second tree structured format, memory for storing the input source and target leaves, a processing module which assigns a cost to each of a plurality of matches, each match comprising a pair of elements selected from the group consisting of a source leaf and a target leaf, an unmatched source leaf, and an unmatched target leaf, a processing module which identifies matches for which a total cost is minimal, wherein each of the leaves is in at least one of the identified matches, a processing module which identifies, from the identified matches, groups of matches wherein each match in the group has a leaf in common, a processing module which identifies, from the groups, probable matches in which more that one target leaf is matched with at least one source leaf and probable matches where more than one source leaf is matched with a target leaf, and an output device for outputting an alignment between leaves of the target document and leaves of the source document which includes the identified probable matches.

BRIEF DESCRIPTION OF THE DRAWINGS

FIG. 6 illustrates the initialization of an exemplary matrix in which costs are assigned to pairs of leaves of a source document and leaves of a target document according to the exemplary embodiment;

FIG. 7 illustrates traversal of the matrix of FIG. 6, in which the path of minimum costs is indicated by the connected blocks;

FIG. 8 illustrates the source and target documents after alignment; and

DETAILED DESCRIPTION

Figure 1:
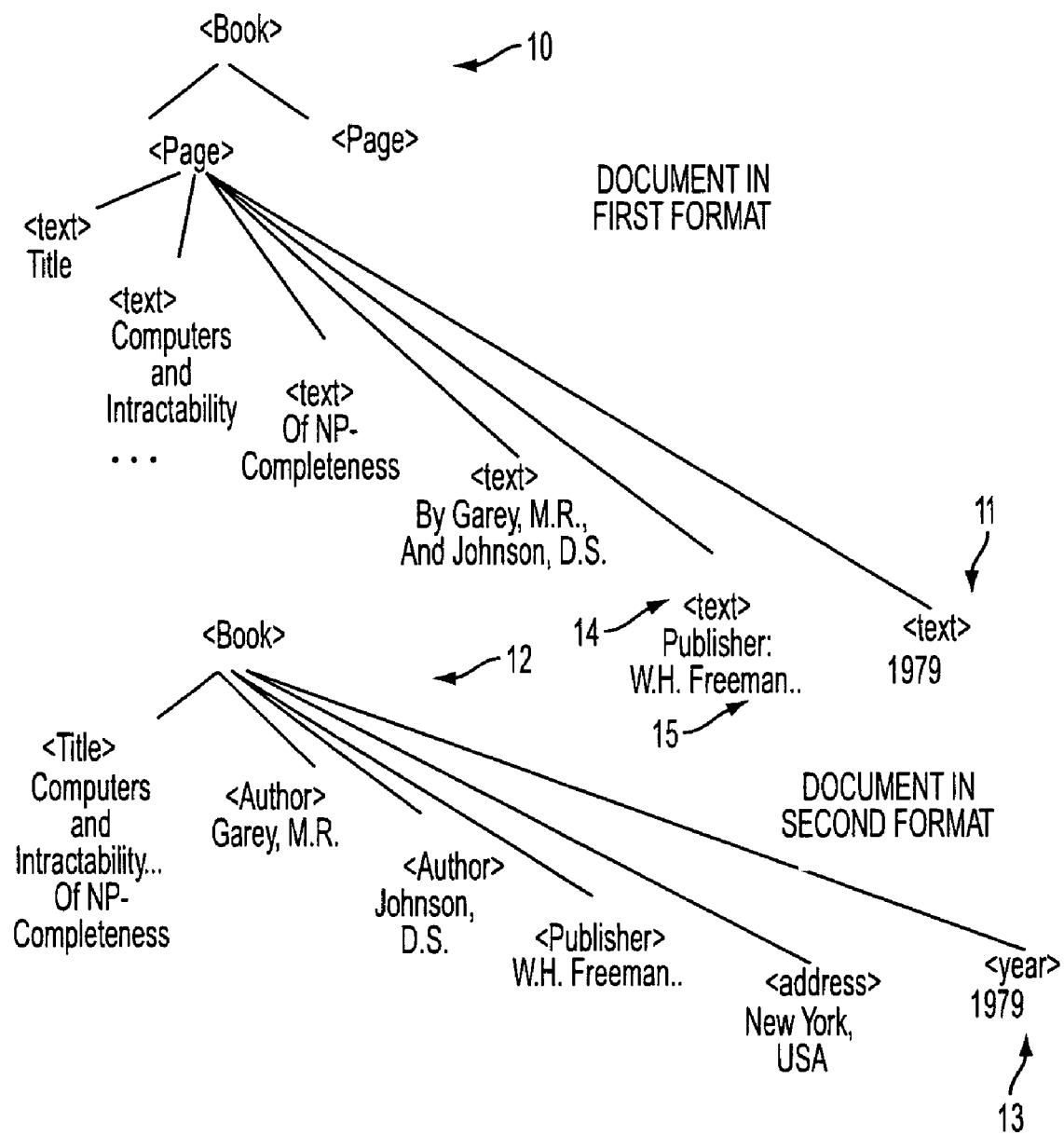
FIG. 1 illustrates the hypertext mark-up language fragment of a book represented as a tree with internal nodes containing different layout instructions and leads containing fragments of the document content in a first XML format and a second XML format.

The exemplary embodiment relates to the conversion of documents from one format to another. Aspects of the exemplary embodiment relate to a method and a system for document alignment. The format of a first or source document may be a proprietary format, such as Word, or a semantically poor extended attribute grammar automatically generated from the proprietary format by tools such as PDF2XML. The format of a second or target document, with which the first document is to be aligned, may be a semantically rich extended attribute grammar, such as an Extended Markup Language (XML) format. By way of example, documents in semantically poor XML format are considered as the first format.

In the exemplary embodiment, documents in the first and second format can each be represented in a schema in the form of a tree structure comprising nodes and leaves, the tree structure of one format being different from the tree structure of the other format. The exemplary method includes aligning leaves of a source document in the first format with leaves of a target document in the second format. Once the two documents are aligned in this way, a set of transformations can be identified which result in the alignment. These transformations can subsequently be applied to the conversion of other documents from the first format to documents in the second format.

The method takes as input a document in the first format and a document in the second format. Both documents have a tree structure in which nodes are labeled with labels and are connected by paths to other nodes and ultimately to leaves, which are also labeled with labels. Each document has essentially the same text content but the content is distributed differently over the leaves. Some of the leaves in the first document may have a direct correspondence with leaves in the second document, i.e., a one-to-one correspondence (1-1) while others may have no corresponding leaf in the first or second document, a zero-to-one (0-1) or a one-to-zero (1-0) correspondence, depending on whether the absent node/leaf is in the first or second document). Additionally, some of the leaves in the first document may have a partial correspondence with a leaf in the second document, where more than one leaf in one document corresponds to a leaf, or in some cases, more than one leaf, in the other document, i.e., a many-to-many (m-n), a many-to-one (m-1), or a one-to-many (1-n) correspondence, where m and n can be any integral value greater than 1, such as 2 or 3. The alignment method includes identifying these correspondences and lack of correspondences allowing the transformation rules which map them to be determined.

As used herein, a document can comprise a portion of a larger document, such as a chapter or page of a larger document.

The method finds application in the conversion of legacy documents available in proprietary formats into a semantically rich XML format. Such conversion processes involve the automatic learning of document transformations. The subsequent learning phases, which will not be described in detail here, may include both a supervised learning and an automated learning phase of document transformations. The learning phase may include transforming ordered trees of the first format or "grammar" into ordered trees of the second format or "grammar." The basis of this transformation may be as described, for example, in U.S. Published Application Serial No. 2005/0154979, published Jul. 14, 2005, by Chidlovskii, et al. entitled "SYSTEMS AND METHODS FOR CONVERTING LEGACY AND PROPRIETARY DOCUMENTS INTO EXTENDED MARK-UP LANGUAGE FORMAT," incorporated herein by reference. For example, as disclosed in the 2005/0154979 application, the transformation of an input tree of the first format into an output tree of the second format may involve labeling elements in the input tree with valid labels or paths from the second format, composing the labeled elements into the output tree with a valid structure, and identifying a transformation of the input tree that achieves the correct composition of the output tree and applies structural rules. The tree transformers may be coded using a learning method that decomposes the converting task into three components which include path re-labeling, structural composition, and input tree transformation, each of which involves learning approaches. During the supervised learning process, it is important that a correspondence between the leaves of the source document and the leaves of the sample target document is established. This enables the learning method to assign a target class to the leaves in the source document. The present method enables a suitable training set to be constructed for the supervised learning process by providing document alignments which identify which target leaves correspond to which source leaves. The exemplary embodiment includes a method to find one such correspondence.

With reference to FIG. 1, to illustrate the exemplary method, as an example, a source document 20 comprising leaves 11 may be a layout-oriented source document describing a book, a portion of which may be represented as follows:

```

....
    <text emphasis-bold="true" font="Helvetica" font-color="#000000"
    font-size="11" height="16.0" width="36.0" x="270.0" y="222.0">
        Title
    </text>
    <text font="Helvetica" font-color="#000000" font-size="10"
    height="13.0" width="228.0" x="270.0" y="255.0">
        "Computers and Intractability: A Guide to the Theory
    </text>
    <text font="Helvetica" font-color="#000000" font-size="10"
    height="13.0" width="84.0" x="270.0" y="269.0">
        of NP-Completeness"
    </text>
    <text font="Helvetica" font-color="#000000" font-size="10"
    height="13.0" width="149.0" x="270.0" y="283.0">
        by Garey, M. R. and Johnson, D. S.
    </text>
    <text font="Helvetica" font-color="#000000" font-size="10"
    height="13.0" width="223.0" x="270.0" y="297.0">
    Publisher: W. H. Freeman and Company, New York, USA </text>
    <text font="Helvetica" font-color="#000000" font-size="10"
    height="13.0" width="18.0" x="270.0" y="311.0">
        1979
    </text>
    ....

```

As a target document 12, an object is to have the same content information presented in semantically rich XML, for example:

```
<book>
    <title> Computers and Intractability: A Guide to the Theory of
    NP-Completeness
    </title>
    <author> Garey, M. R. <author>
    <author> Johnson, D. S. </author>
    <publisher> W. H. Freeman and Company </publisher>
    <address> New York, USA </address>
    <year> 1979 </year>
</book>
```

A tag 14 is associated with each leaf. In the illustrated embodiment, the tags are distinguished by the symbols "<" and ">" at the beginning and end of each tag to distinguish the tag from the content 15. Although the total content 15 of the leaves 13 of the target document is substantially the same, it is distributed differently among the leaves.

In the exemplary embodiment, both documents contain six leaves 11, 13, although it will be appreciated that it is not necessary for each document to have the same number of leaves. If the leaves are numbered from one to six for both documents in order of their appearance, prefixed with s for the source document and t for the target document, the correct match is:

$$([s_1],[\;])([s_2,s_3],[t_1])([s_4],[t_2,t_3])([s_5],[t_4,t_5])([s_6],[t_6]).$$

There are a number of alignment issues that can be observed. The book title is spread over two lines in the source document, and thus appears in two text leaves. In the target document, the title is all in one leaf. The source document contains quotes which are absent in the target document. The authors are together and prefixed with "by" in the source document while they are separated into individual leaves and presented without any extra words in the target document.

Different types of alignment can be identified. For example, six different types of matches may be identified:

1-0 (unmatched source leaf), such as the pair $([s_1], [\;])$ in the above example 0-1 (unmatched target leaf), which could be represented by a pair such as $([\;], [t_n])$ 1-1 (target leaf matches source leaf), a direct match, as illustrated by the pair $([s_6], [t_6])$ m-1 (more than one source leaf is matched with one leaf in the target document), such as the pair $([s_2, s_3], [t_1])$ 1-n (more than one target leaf is matched with one leaf in the source document), such as the pair $([s_4], [t_2, t_3])$ m-n (more than one source leaf is matched with more than one leaf in the target document).

Additionally, even though the pairs are considered to be a match, they do not always match exactly (e.g., the removal of quotes in the target document). A measure of "soft similarity" is thus incorporated into the matching process.

Figure 2:
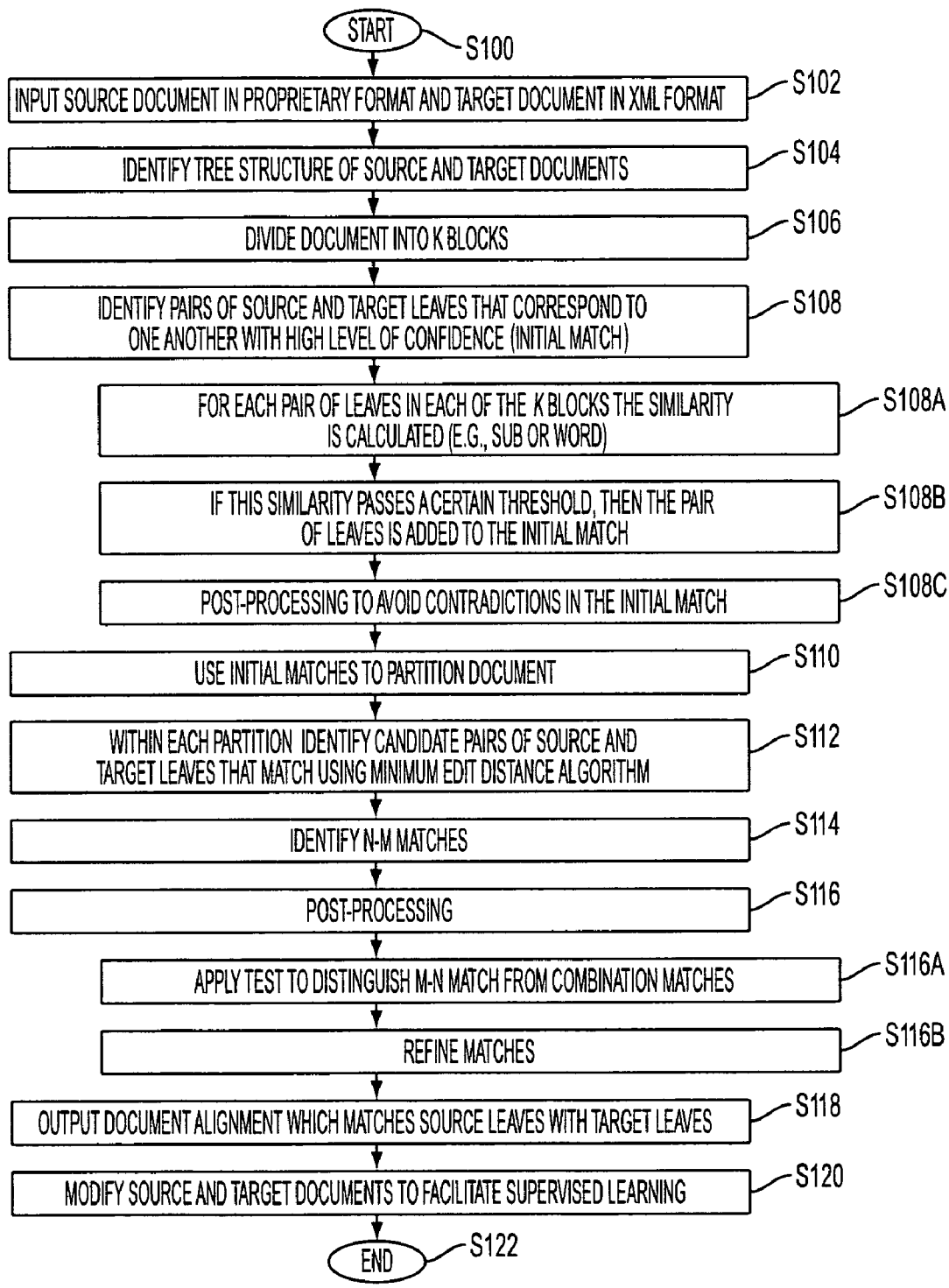
FIG. 2 is a flow diagram of an exemplary method for aligning leaves of a source document and a target document.
Figure 3:
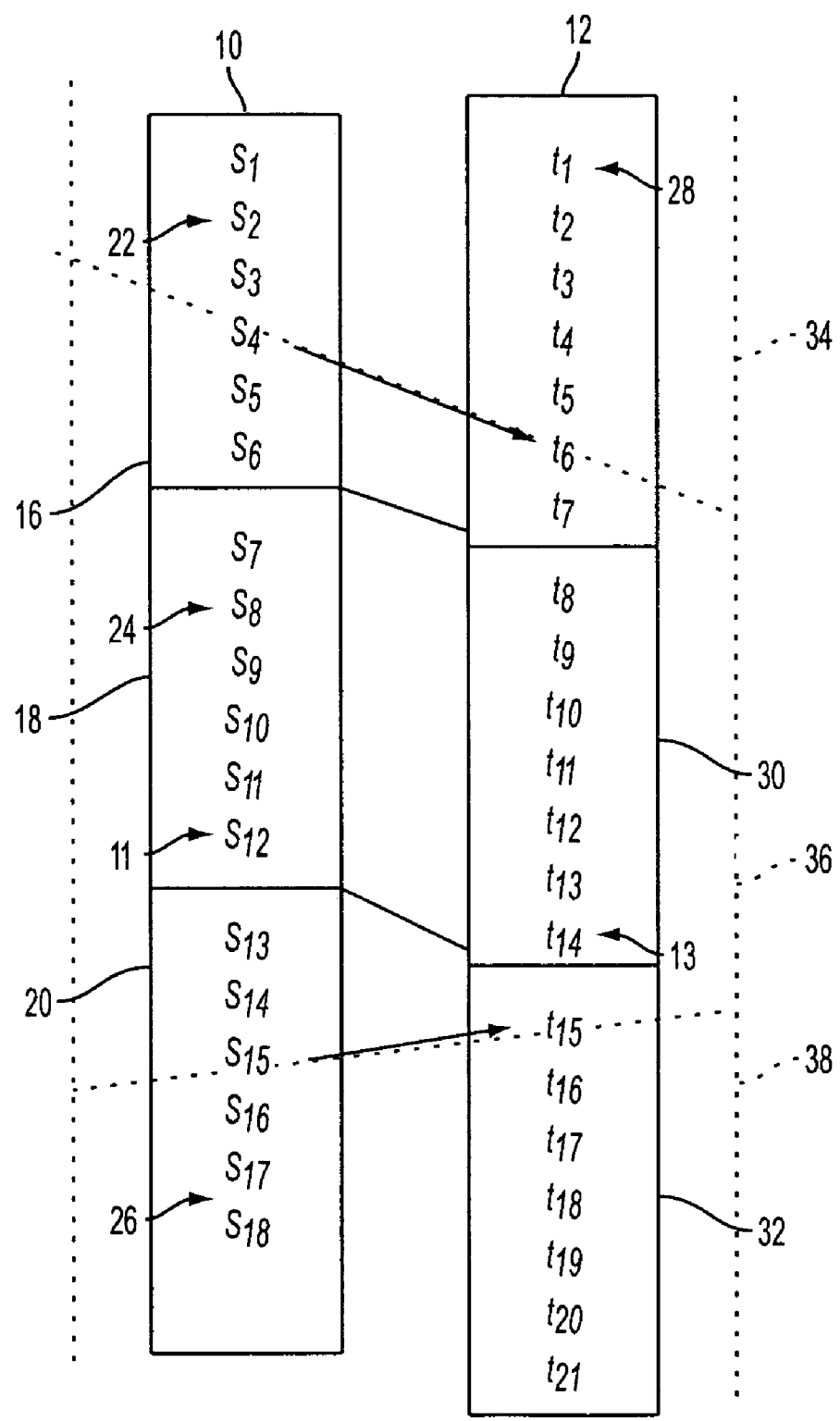
FIG. 3 is a schematic view of a sequence of leaves in a source document in process of being aligned with a sequence of leaves in a target document.

FIG. 2 illustrates the steps of an exemplary method of aligning two documents 10, 12 illustrated schematically in FIG. 3. It will be appreciated that fewer or more steps may be employed and that the order of steps may differ from that illustrated. For simplicity, source document 10 is illustrated as having eighteen source leaves 11, labeled in order of appearance in the document from $s_1$ to $s_{18}$ and target document with twenty-one target leaves 13, labeled $t_1$ to $t_{21}$. It is understood that an actual document may have many more leaves. The method begins at step S100. At Step S102, a pair of source and target documents 10, 12 are input to a suitable automated document alignment apparatus, which performs the following steps. At step S104, the alignment apparatus recognizes the tree structure and leaves $s_1$ to $s_{18}$ and $t_1$ to $t_{21}$ of the two documents and their associated content. At step S106, the documents are subdivided into an equal number k of blocks 16, 18, 20, of leaves, each block comprising a respective set 22, 24, 26 of source leaves and a respective set 28, 30, 32 of target leaves, respectively. At step S108, source and target leaves from the same block (e.g., set 22 and set 28 in block 16) are examined to identify any direct matches which have a high level of confidence of being an actual match due to their similarity. These direct matches are then used to subdivide the documents into a plurality of partitions 34, 36, 38 with the direct matches forming the nodes of the partitions (Step S110). The next step takes each partition and identifies candidate (1-0), (0-1), and (1-1) matches by applying an algorithm which determines the minimum edit distance (Step S112). In this step, only matches within a partition (e.g., $s_5$-$s_{14}$ with $t_7$-$t_{14}$) are considered. At step S114, candidate (1-n), (m-1), and (m-n) pairs are identified from the algorithm in step S112 by identifying groups of adjacent matches which have a leaf in common. A post-processing step (Step S116) is used to refine the (1-n), (m-1), and (m-n) matches by identifying probable (1-n), (m-1), and (m-n) matches and probable (1-0), (0-1), and (1-1) matches. At Step S118, the alignment apparatus outputs an alignment between the leaves 11 of the source document and the leaves 13 of the target document which includes the matches identified in the refinement step. Furthermore, the source and the target documents 10, 12 may be modified accordingly to make supervised learning with them more feasible (Step S120). The method ends at Step S122. These steps will now be described in greater detail.

As noted above, an objective of the method is to find pairs of m source leaves and n target leaves that correspond to one another (step S108). More formally, let $\{s_1, \ldots, s_m\}$ be the leaves of the source document and $\{t_1, \ldots, t_n\}$ be the leaves of the target document. The aim is to identify the correspondence $\cup_i [\{s_1^{(i)}, \ldots, s_{m_i}^{(i)}\}, \{t_1^{(i)}, \ldots, t_{n_i}^{(i)}\}]$ with $\{s_1^{(i)}, \ldots, s_{m_i}^{(i)}\} \cap \{s_1^{(j)}, \ldots, s_{m_j}^{(j)}\} = \emptyset$ and $\{t_1^{(i)}, \ldots, t_{n_i}^{(i)}\} \cap \{t_1^{(j)}, \ldots, t_{n_j}^{(j)}\} = \emptyset$ for all i, j that maximizes the summed pair similarity $\Sigma_i \text{sim}(\{s_1^{(i)}, \ldots, s_{m_i}^{(i)}\}, \{t_1^{(i)}, \ldots, t_{n_i}^{(i)}\})$ and is minimal in the sense that no pair $[\{s_1^{(i)}, \ldots, s_{m_i}^{(i)}\}, \{t_1^{(i)}, \ldots, t_{n_i}^{(i)}\}]$ can be split into subpairs $\lfloor\{s_1^{(i')}, \ldots, s_{m_i}^{(i')}\}, \{t_1^{(i')}, \ldots, t_{n_i}^{(i')}\}\rfloor$ and $\lfloor\{s_1^{(i'')}, \ldots, s_{m_i}^{(i'')}\}, \{t_1^{(i'')}, \ldots, t_{n_i}^{(i'')}\}\rfloor$ such that sim $(\{s_1^{(i')}, \ldots, s_{m_i}^{(i')}\}, \{t_1^{(i')}, \ldots, t_{n_i}^{(i')}\}) + \text{sim}(\{s_1^{(i'')}, \ldots, s_{m_i}^{(i'')}\}, \{t_1^{(i'')}, \ldots, t_{n_i}^{(i'')}\}) = \text{sim}(\{s_1^{(i)}, \ldots, s_{m_i}^{(i)}\}, \{t_1^{(i)}, \ldots, t_{n_i}^{(i)}\})$.

Here, the similarity measure $\text{sim}(\{s_1^{(i)}, \ldots, s_{m_i}^{(i)}\}, \{t_1^{(i)}, \ldots, t_{n_i}^{(i)}\})$ measures the similarity between the concatenation of the contents of the source leaves $s_1^{(i)}, \ldots, s_{m_i}^{(i)}$ and the concatenation of the contents of the target leaves $t_1^{(i)}, \ldots, t_{n_i}^{i}$.

The above expressions can be summarized as follows: The aim is to find correspondences between source and target leaves which are similar so that, summed over the entire document, the summed pair similarity is maximized and that pairs of leaves cannot be further subdivided into subpairs. The present method provides a way to approach this optimal solution by making assumptions which make processing easier and less time consuming.

The correspondences sought are completely based on the content 15 of the leaves 11, 13 and not on the tree structure of the given documents. Structural aspects are treated in the learning phase of the document transformation process, which are described elsewhere. Hence, tree alignment methods need not be considered in detail here.

The exemplary alignment method (Step S112) involves sequence alignment. String alignment is another instance of sequence alignment where the sequences are composed of letters. Such alignments have been used, for example, in DNA sequencing. In the present case, the sequences are composed of document leaves and their contents. For strings, many algorithms have been proposed. The method described here adapts a string alignment method which calculates the Levenstein distance (minimum edit distance) between two strings. String alignment methods are described, for example, in V. I. Levenstein, "Binary codes capable of correcting deletions, insertions, and reversals", (Russian) Doklady Akademii nauk SSSR, Vol. 163, No. 4, pp. 845-8 (1965); also Cybernetics and Control Theory, Vol. 10, No. 8, pp. 707-10, (1966), as discussed, for example, in U.S. Pat. No. 6,377,945, the disclosure of which is incorporated herein by reference. In the case of strings, the alignment process is relatively simple because a letter is either present in one string or it is not present.

In the case of document alignment, the minimum edit distance is a function of the minimum number of edit operations needed to transform one leaf structure 11 into another 13, including direct matches (1-1), (0-1), (1-0) as well as partial matches (m-n), (m-1), (1-n).

The method may involve calculation of four matches:

1. Initial match: The initial match consists of identifying pairs of leaves which each have a very high confidence of being an actual 1-1 match (pairs where the level of similarity, as determined by a similarity measure, is high) (Step S108). It is used to decompose the overall problem into smaller sub-problems (partitions) to reduce complexity (FIG. 5).
2. Matrix match: A minimum edit distance algorithm may then be used to produce 1-1, 1-0, and 0-1 pairs (FIGS. 6-7). The algorithm is applied to each of the partitions formed in the initial match. The results of the sub-problems are then combined to form an overall result.
3. M-N match: From the matrix match, candidates for m-n, m-1, and 1-n correspondences are identified.
4. Post-processed match: In the post-processing step, the candidate pairs are further evaluated, and the final match is computed (Step S116).

Fewer or more matches may be employed than those listed above. Each of these matches is described in greater detail below.

In the exemplary embodiment, the sequences to be aligned are sequences of leaves 11, 13 of tree-structured XML-documents 10, 12, such as the two examples shown above in FIG. 1. There are several basic constraints that a typical XML schema describes, including: (1) the attributes that an element should/may contain (the types of the attribute values (mainly string types) and the mandatory or optional nature of occurrences of these attributes), (2) the type and the order in which elements can be contained inside another element (the content model of the element, namely the sub-element should be of a certain name or type or that a subelement could be of any type, and (3) a regular expression system to express how these elements occur, wherein this regular expression system can be expressed by a limited number of operators). A software module called an XML processor is used to read XML documents and provide access to their content and structure (Step S104).

String Alignment

To provide an understanding of alignment techniques in general, a description of string alignment will first be given. Several algorithms are available for the problem of string alignment, notably from the application domain of bioinformatics. For example, suppose the object is to align the strings $s_1$="abc" and $t_1$="xaxbx". An algorithm is used to compute the minimum edit distance or Levenstein distance, which makes use of the alignment of the strings. The minimum edit distance is the minimum cost which is incurred in alignment of the two strings in terms of basic edit operations (insert, delete, replace) which are needed to transform one string into the other. In a simplified example, it is assumed that each of the three edit operations is associated with a cost of one. Then, the minimum edit distance in the illustrated example is three, as the first two x's are inserted into $t_1$ and the c in $s_1$ is replaced by the third x in $t_1$.

Figure 4:
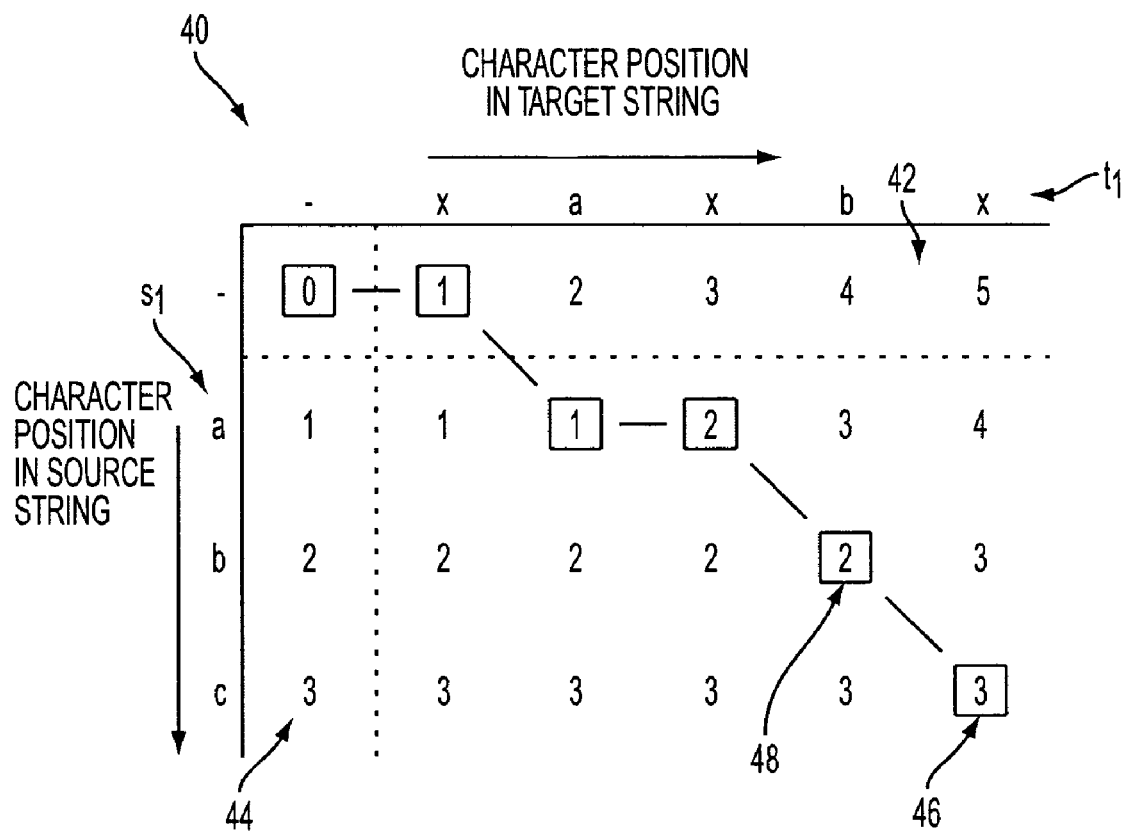
FIG. 4 illustrates an exemplary matrix for aligning two strings, the alignment is shown by the connected blocks.

FIG. 4 illustrates the algorithm in a matrix form 40. $s_1$ is the "vertical" string, and $t_1$ the "horizontal" string. A dummy row 42 and a dummy column 44 are inserted at the beginning. They denote the empty string, their purpose is to initialize the matrix. For example, the insertion of the complete string $t_1$ has a cost of five, which equals the minimum edit distance when compared to the empty string. When calculating a new element, three neighboring elements are considered: the one directly to the left, the one on top, and the one on the diagonal to the upper-left. The new matrix element m(i,j) is calculated as follows:

$$m(i, j) := \min \begin{cases} m(i-1, j-1) + cost_{replace} & (cost_{replace} = 0 \text{ if } s_1(i) = s_2(j)) \\ m(i, j-1) + cost_{insert} \\ m(i-1, j) + cost_{delete} \end{cases}$$

At the bottom right corner of the matrix in FIG. 4, the minimum edit distance 46 is found (in this case, 3). To obtain an optimal alignment, the matrix is traversed backwards. Specifically, the matrix is traversed by starting at the bottom right corner and moving in one of three directions: left, up, or diagonally left-up. In traversing the matrix, the minimum distance value (i.e., the lowest value) is always followed. The diagonal move has priority in case of equality of values. If a diagonal move is about to be made, this indicates that the two current string elements are aligned. If a move to the left is about to be made, this indicates that an element of $t_1$ is aligned with a gap (meaning a gap has to be inserted into $s_1$. If a move upwards is about to be made, this indicates that an element of s1 is aligned with a gap (meaning it has to be deleted from $s_1$. Pairs of elements, such as illustrated at 48, which lie on the path of the minimum edit distance are said to be aligned. From FIG. 4, the algorithm obtains the following alignment:

| – | a | – | b | c |
|---|---|---|---|---|
| x | a | x | b | x |

As can be seen, the first pair (–, x) corresponds to a (0-1) alignment, for example. Many variations of this basic algorithm exist, notably in the domain of bioinformatics. Among them are the algorithms described in S. B. Needleman and C. D. Wunsch. "A General Method Applicable to the Search For Similarities In The Amino Acid Sequence Of Two Proteins." *J. Molecular Biol.*, 48:443-453 (1970), T. F. Smith and M. S. Waterman, "Identification of Common Molecular Subsequences," *J. Molecular Biol.*, 147(1): 195-197 (1981), and A. E. Monge and C. Elkan, "The Field Matching Problem: Algorithms and Applications," in *Proceedings of the ACM SIGKDD International Conference on Knowledge Discovery and Data Mining*, pages 267-270, Portland, Oreg., USA (August 1996). Above-mentioned application Ser. No. 11/137, 566, incorporated herein by reference, adapts string alignment methods to the alignment of words in translation of natural languages. An overview of string distances can be found in S. Chapman, "String Similarity Metrics For Information Integration," at: http://www.dcs.shef.ac.uk/sam/stringmetrics.html.

Document Alignment

In the case of document alignment, rather than aligning letters, the alignment seeks to align leaves, with all of the characters (and spaces between characters) of a leaf being treated as a unit to be aligned. There are some substantial differences between the alignment of strings and the alignment of document leaves 11,13. First, the elementary similarity measure between two basic entities (letters vs. leaves) is more complex in the document scenario. As discussed above, a notion of soft similarity is generally needed in the case of document alignment because the leaf content of two matched leaves is not always identical. Second, there is the added complexity which arises in documents. The basic algorithm has a complexity of $O(l_1 l_2)$ where $l_1$ and $l_2$ are the lengths of the sequences. In the case of document alignment, both of these lengths can easily be larger than 10,000. In the case of string alignment, it is more common that one of strings is significantly shorter, although suitable heuristic algorithms, such as Fast A and BLAST have been developed to deal with longer strings, as described, for example, in D. J. Lipman and W. R. Pearson, "Rapid and Sensitive Protein Similarity Searches," *Science*, 227:1435-1441 (1985) and S. F. Altschul, W. Gish, W. Miller, E. M. Myers, and D. J. Lipman, "Basic Local Alignment Search Tool," *J. Molecular Biol.*, 215:403-410 (1990). Third, there is the question of multiple matches (m-n, 1-n, and m-1 matches). In the case of document alignment, it frequently happens that one leaf 13 of the target document 12 corresponds to several leaves 11 of the source document 10. The typical leaf 11 of the source document is a line of text determined by the layout of the document. A leaf 13 of the target document 12 is often a block corresponding to several lines of the source. In the string scenario, one letter corresponds precisely to one letter or to a gap. There are sometimes different alignments of equal quality, but in each one of them there are only 1-0, 0-1, and 1-1 correspondences.

Sentence alignment is also a related area. The problem here is to align the words and linguistic structures of sentences of different languages. This problem can also be seen as sequence alignment, even though the constraint of order preservation is in general not satisfied. Brown et al. describe a method that is solely based on the sentence lengths, but they consider only at maximum two sentences of one language corresponding to one of the other. See P. F. Brown, J. C. Lai, and R. L. Mercer, "Aligning Sentences in Parallel Corpora," in *Proceedings of the Annual Meeting of the Association for Computational Linguistics (ACL)*, pp. 169-176, Berkeley, Calif. USA (June 1991). Dagan, et al. enhance this model by considering the word positions within an alignment. See Dagan, K. Church, and W. Gale, "Robust Word Alignment for Machine Aided Translation," in *Proceedings of the Workshop on Very Large Corpora*, pp. 1-8, Columbus, Ohio, USA (June 1993). Melamed uses an expanding rectangle search strategy. See I. D. Melamed, Bitext Maps and Alignment Via Pattern Recognition," *Computational Linguistics*, 25(1):107-130 (1999).

There are several differences between the sentence alignment problem and the problem of tree-structured document alignment. Sentence alignment follows the paragraph/sentence/word-hierarchy. In document alignment, the PC-DATA segmentation intervenes on levels of sentences, words, syllables and characters at the same time and is much more arbitrary. Here, the translation confidence of sentence alignment is replaced by a non-trivial leaf similarity. Sentence alignment deploys important knowledge and statistics (bilingual lexicon, language sentence length statistics) and makes linguistic-based assumptions (short sentences are translated into short sentences). Such assumptions are generally not applicable to document alignment.

Another difference between document alignment and sentence alignment is that the total content (ignoring the order) of the leaves of the target document 12 is substantially identical to the total content of the leaves of the source document 10. In the Example of FIG. 1 the total content differs, for example, in the removal of quotation marks, the removal word, "by", and the like. The majority of the document content 15 (at least 90% and typically, at least 98%) of the total content is retained.

One approach to document alignment is to require that the resulting alignment should respect the document order of both documents. This is generally achievable where the target documents produced by human annotators respect the reading order of the source documents. Furthermore, reading order reconstruction tools are widely available.

Similarity between Document Leaves

The present method addresses the issue of the acceptability of imperfect matches by assigning a level of similarity for two document leaves (Step S108A). One approach is to calculate the minimum edit distance between the contents of two leaves 11, 13 in a manner similar to that discussed above for string alignment (FIG. 4). While calculation of minimum edit distance between their contents 15 is one approach, it suffers from a drawback. The content 15 of one leaf is frequently a substring of the content of the other leaf (e.g., an m-1 or 1-n match). Depending on their length difference, the minimum edit distance can be quite significant in this case. Thus, a similarity measure based on minimum edit distance alone may lead to inaccurate results. The calculation of the minimum edit distance is also quite computationally expensive. A more desirable approach is to view a substring match as an acceptable match and provide a weighting factor which takes this into account. In the present embodiment, the similarity of one leaf to another is assigned a similarity measure which takes into account such substring alignments. One or more of the following methods may be used to determine a measure of the similarity between leaves:

1. Modified minimum edit distance (MED): The similarity is determined as the length (counting each character and optionally also spaces between characters) of the shorter content 15 minus the minimum edit distance between the two contents (e.g., as determined for the string sequences in FIG. 4), the minimal possible value being zero.

e.g., in the example of FIG. 1 above, comparing the leaf $s_2$: "*Computers and Intractability: A Guide to the Theory* with the leaf $t_1$: *Computers and Intractability: A Guide to the Theory of NP-Completeness*,
   the similarity=52−20=32

The shorter content (52 characters and spaces) appears in the leaf $s_2$ The minimum edit distance is arrived at by adding 1 (for removing the set of quotes), to the number of spaces and characters (31) which are to be added to generate the $t_1$ leaf.

2. Substring length (SUB): If one content (or a sequence thereof) is a substring of the other one, the similarity is defined as the length of the former, otherwise 0.

In the above example, similarity=0 (neither content is a substring of the other in the example because of the quotes in $s_2$)

3. Common words number (WORD): The similarity is the sum of the lengths of the common words between the two contents.

In the above example, similarity=44

4. Matching block length (MBL): A list of matching blocks is computed; the similarity is the sum of the blocks' lengths.

In the above example, the matching block is *Computers and Intractability: A Guide to the Theory* and the similarity=51

5. Refined matching block length (RMBL): The MBL is refined by imposing certain constraints whose violation leads to a similarity of 0. For example, thresholds may be introduced for minimum block length (e.g., if block length is less than 3 characters, ignore"), maximum block number (e.g., "consider no more than 3 blocks"), minimum overall similarity (e.g., "if similarity is less than 5, similarity=0") and a minimum similarity/length ratio (e.g., "if minimum similarity to length ratio is less than 0.1, similarity=0"), or combinations thereof.

In the illustrated example, the similarity=51, the same as for MBL.

Optionally, the result obtained by any of the measures above may be normalized. For example, in the case of WORD, the similarity may be normalized by multiplying the result by the length of the shorter content and dividing by the number of characters that are part of a word (52/44 in this case). In this way, each of the similarity measures returns a value between 0 and the same maximum value (52 in the case of the example).

In all the above measures, a higher similarity number is indicative of a greater degree of similarity between the two leaves 11, 13 in question, although it is to be appreciated that the measures may give different results which do not always agree. All of the measures, however, tend to output higher similarity values where the length of the similar content is higher. All these similarity measures return values between 0 and the length of the shorter of the two contents. It has been found that the similarity measures SUB and WORD are much more efficient to compute than the others although in general, RMBL gives the best results. A combination of these similarity methods may be employed. For example, SUB or WORD may be used in the initial stages of the algorithm (for the initial match and the matrix match (Steps S108 and S112), and RMBL may be used for refinement in the post-processing phase (Step 116). It will be appreciated that other similarity measures may be adopted which compare the contents of two leaves using some metric and provides a value on a scale which varies between a minimum value and a maximum value.

For matches where a leaf of the source document is not paired with a leaf of a target document, or vice versa (unmatched pairs), a similarity measure of 0 is automatically assigned. The initial match and matrix match can both use these similarity measures, as will be described below.

The Initial Match

The initial match (Step S108) is an optional step which is used to reduce the overall run-time of the overall algorithm (step S112). The initial match uses one or more of the similarity measures discussed above to identify pairs of leaves which have high similarity values and thus which have a high probability of being an actual 1-1 match. For example, pairs of leaves with a similarity which exceeds a threshold value (which may be determined empirically) may be selected in the initial match. Or, the similarity values of pairs of leaves may be ranked and a preselected number of the highest ranking pairs selected. These initial match pairs may then be used to decompose the overall alignment problem.

The basic minimum edit distance algorithm has the complexity $O(l_1 l_2)$ where $l_1$ and $l_2$ are the lengths of the two documents (in terms of number of leaves), in other words quadratic. Many of the computational steps involved are probably unnecessary in the case of document alignment. Because the two documents to be aligned are basically the same, it is unlikely that a leaf at the beginning of one document matches another leaf at the end of the other document (in fact, such a match would most likely be a mismatch. Optimization methods can be employed with favor matches which are more closely positioned in the documents over matches which have substantially different positions. For example, if the sequences of leaves are arranged in matrix form 50 (FIG. 5) as it is done for the basic algorithm (FIG. 4), then the correct match has a high probability of being found along the diagonal from the top-left to the bottom-right. The goal of the initial match phase (Step S108) is to find pairs of leaves, for which it is certain that they match i.e., they are a complete 1-1 match or have a similarity, as measured by one of the four similarity methods described above, which is high, e.g., exceeds a threshold value). These pairs allow the match problem to be decomposed.

In one method, a number k is selected and the leaves of the two documents divided into k blocks, in sequence, each block having the same number of leaves 11, 13 of each document (FIG. 3, Step S106). For example, k can be from about ⅕ to about ½₀₀ times the number of leaves in the source or target document (corresponding to values k=5 and k=200, respectively), depending on the size of the document. Then:

1. For each pair of leaves in each of the k blocks the similarity is calculated (e.g., SUB or WORD) (Substep S108A).
2. If this similarity passes a certain threshold, then the pair of leaves is added to the initial match (Substep S108A).
3. Optionally, some post-processing is done to avoid contradictions in the initial match (Substep S108A).

Substep S108A may include eliminating, from the initial match, pairs in which their relative positions in the document suggest that they are unlikely to be an actual match, e.g., a pair in which the source leaf occurs before a source leaf in another initial match and the target leaf occurs after the target leaf in the other match. The purpose of this step is to retain only those pairs for which there is a high level of confidence that an actual match exists.

The initial match then is used to decompose the matrix problem into partitions 34, 36, 38 (Step S110). The matrix algorithm is later run on the generated partitions (Step S112) and the results of these sub-problems are subsequently combined to form the overall result.

Figure 5:
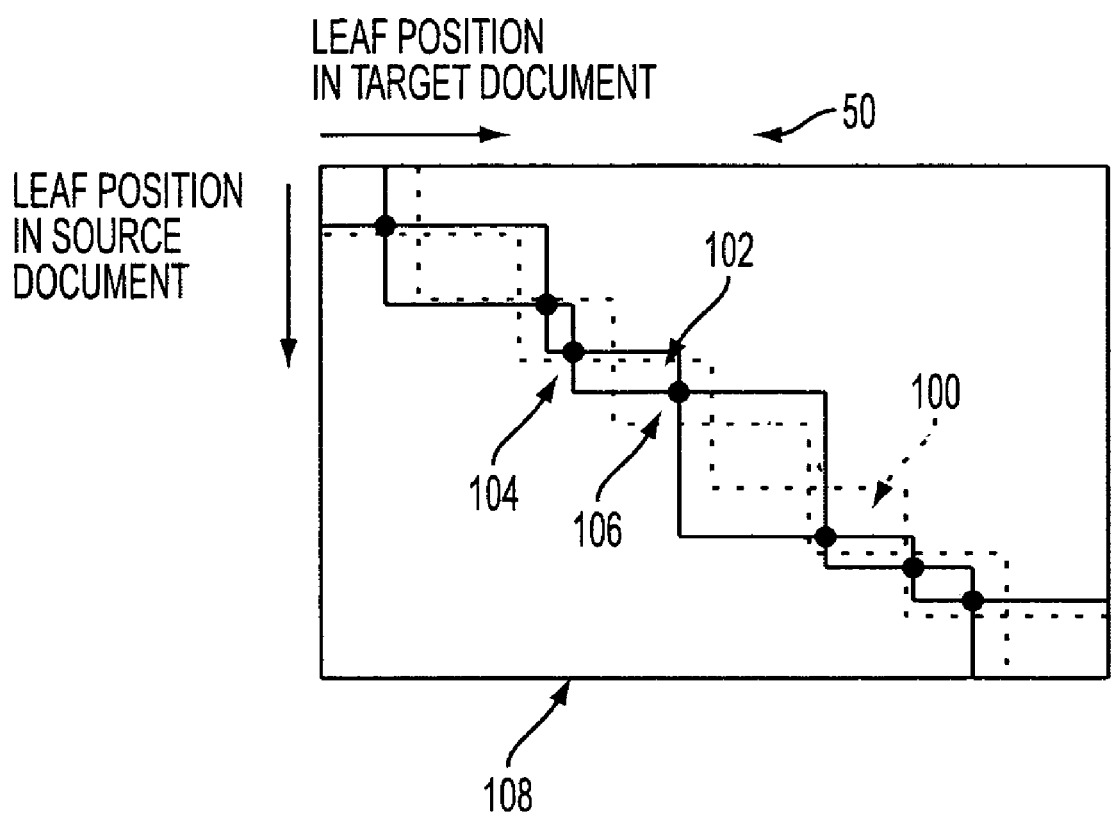
FIG. 5 illustrates an exemplary matrix for alignment of source and target documents according to the exemplary embodiment.

FIG. 5 illustrates the initial match process in matrix form with the leaves of the target document arranged in sequence from left to right in the x direction and the leaves of the source document arranged in sequence from top to bottom in the y direction. The dashed rectangles indicate the blocks 100 within which an initial match is sought (analogous to blocks 16, 18, 20 in FIG. 3). In FIG. 5, k=8. The solid lines indicate the partitions 102 (analogous to partitions 34, 36, 38 in FIG. 3). Each partition 102 is bounded by nodes 104, 106, etc. comprising first and second pairs of leaves which passed the initial match (step S108). From these matching points 104, 106, etc, the decomposition, indicated by the solid lines, is derived (Step S110). In the illustrated embodiment (FIG. 5), seven initial matches 104, 106, etc are obtained, allowing the document to be divided into eight sub-problems 102. The reduction in the complexity is the difference between the area of the rectangle 108 bounding the blocks 16, 18, 20 and the total area of each of the partitions 102.

The performance gain derived by first dividing the document into k blocks cannot be easily estimated in practice because the number k only influences the computation of the initial match but not the following steps of the overall method. In the worst case, the initial match is empty, so no decomposition is done and no gain whatsoever is achieved. In general, a decomposition into p sub-problems 102 reduces the complexity by p. Because p is often linearly correlated to $l_1$ or $l_2$, the overall complexity would be reduced to linear, $O(l_2)$ or $O(l_1)$, respectively in that case. In general, by selection of k, a significant reduction in complexity can be achieved, reducing computational time. However, it is to be appreciated that step S106 may be eliminated.

Matrix Match

The matrix match (Step S112, FIGS. 6-7) is calculated in a similar manner to that described for string alignment (FIG. 4), by incorporating a factor which takes into account the similarity measure between the leaves. This calculation is done for every partition 102 of the decomposition derived from the initial match. Afterwards, the results are combined to form the global result (step S118).

In the case described above, the similarity measures between two leaves $s_i$ and $t_j$ always return a value $sim(s_i, t_j)$ between 0 and the length of the shorter of the two contents, which is denoted $l_{ij}$. In order to use a cost-based string alignment algorithm at step S112, the similarity measure is transformed into a cost. In one embodiment, the cost is a function of the similarity measure $sim(s_i, t_j)$ and the value $l_{ij}$. For example, cost may be computed as:

$$\text{cost } (s_i, t_j) = 1 - \frac{sim(s_i, t_j)}{l_{ij}} \quad (1)$$

However, this definition is independent of the length of the contents. Thus, a content consisting of just one character is a perfect match (resulting in zero cost) for another (possibly very long) content containing that one character. To resolve this problem, the similarity measure may be weighted in the following manner:

$$\text{cost } (s_i, t_j) = \begin{cases} 1 - \dfrac{l_{ij} - \log(l_{ij})}{l_{ij}} \dfrac{sim(s_i, t_j)}{l_{ij}} & \text{if } l_{ij} \geq 3 \\ 1 & \text{if } l_{ij} \leq 2 \end{cases} \quad (2)$$

This expression assigns a maximum cost (1 in the illustrated embodiment) for all matches where the length of the shorter of the two contents is no greater than a predetermined value, 2 in the illustrated embodiment. For pairs where the shorter content exceeds the predetermined value, a weighted cost is assigned which takes into account both the similarity measure and the shorter content length $l_{ij}$. The cost thus tends to decrease as the length of the shorter content increases (for constant similarity measures), thereby allowing the algorithm to favor matches between such pairs.

The weighting factor $$\frac{l_{ij} - \log(l_{ij})}{l_{ij}}$$

reaches its minimum for $l_{ij}=e$, so for $l_{ij}$ assuming zero, one, or two, the cost is defined to be one.

To illustrate this, consider the example of FIG. 1 and treat it as a whole (without any decomposition). Both documents consist of six leaves. The matrix is initialized with the basic costs between these leaves. For example, RMBL is used as the similarity measure and the costs determined according to Eqn. 2, above. The result is shown in FIG. 6.

In this case, the final alignment is clear from the initialization. This is not always true. We calculate the final matrix as before. Specifically, each new matrix element m(i,j) is calculated from the initial cost $m_0(ij)$ as follows:

$$m(i, j) = m_0(i, j) + \min \begin{cases} m(i-1, j-1) \\ m(i, j-1) \\ m(i-1, j). \end{cases}$$

The result is shown in FIG. 7. This figure also shows the traversal of the matrix, which is done as before by starting at the end point and following the path of the minimal cost. The resulting alignment is:

| $s_1$ | $s_2$ | $s_3$ | $s_4$ | — | $s_5$ | — | $s_6$ |
|---|---|---|---|---|---|---|---|
| — | $t_1$ | — | $t_2$ | $t_3$ | $t_4$ | $t_5$ | $t_6$ |

This is a first step that is now refined to account for partial (M-N) matches (Step S114).

The M-N Match

As already pointed out, the standard alignment algorithm produces only 1-1, 1-0, or 0-1 matches. For the present application, m-1, 1-n, and m-n matches are also considered. Steps S114 and S116 identify combinations of 1-1, 1-0, and/or 0-1 matches which could be merged into m-1, 1-n, and m-n matches (which are all referred to herein generally as M-N matches) by first identifying candidate M-N matches (step S114) and then eliminating from the set of candidate M-N matches, any candidate matches for which the two or more merged pairs, from which the candidate matches are derived, have the same or a higher similarity (step S116).

Suitable candidates for these matches are apparent from the traversal of the matrix in FIG. 7. Every point in the traversal corresponds to a match between a source leaf 11 and a target leaf 13 or an unmatched pair. By grouping these points together, candidate M-N pairs are evident. Specifically, the method includes identifying, from the matches identified by the alignment algorithm, groups of two (or more) matches wherein each match in the group has a leaf in common.

In particular, each time a pair is horizontally aligned with an adjacent pair in the traversal, this indicates that more than one target leaf could be matched with a single source leaf, i.e., a 1-n match, rather than a combination of a 1-1 and one or more 0-1 matches, which the conventional algorithm outputs. Similarly each time a pair is vertically aligned with an adjacent pair in the traversal, this indicates that more than one source leaf could be matched with a single target leaf (a m-1 match), rather than a combination of a 1-1 and one or more 1-0 matches, which the conventional algorithm outputs. In rarer cases, where a pair is both horizontally aligned with an adjacent pair and vertically aligned with another adjacent pair in the traversal, this indicates that more than one source leaf could be matched with more than one target leaf. The present method identifies these potential 1-n, m-1, and m-n matches (Step S114). However, since the possibility also exists for these N-M matches to be combinations of a 1-1 match with one or more 1-0 and/or 0-1 matches, the method applies one or more tests to distinguish probable M-N matches from probable combinations of matches (Step S116).

In the example, applying Step S114 leads to:

$$([s_1],[\ ])([s_2, s_3],[t_1])([s_4],[t_2,t_3])([s_5],[t_4,t_5])([s_6],[t_6]).$$

This list looks already exactly like the desired result. Note that every leaf appears in this candidate list, and that it appears in its most likely group as the matrix traversal is guided by similarity. Note furthermore, that the M-N candidate list can also be obtained by cutting the resulting traditional alignment:

$$s_1 // s_2 s_3 // s_4 \quad\quad // s_5 \quad\quad // s_6$$

$$\_\_\_ // t_1 \quad\quad // t_2 t_3 // t_4 t_5 // t_6$$

The example above only shows how m-1 and 1-n matches can occur. The general case of the m-n match, which is rare in practice, occurs if the traversal through the matrix takes the shape of a staircase.

Postprocessing

The goal of the postprocessing step (Step S116) is to transform a candidate M-N match into a real match. Suppose candidate source leaves $\{s_1^{(i)}, \ldots, s_{m_i}^{(i)}\}$ are to be matched to candidate target leaves $\{t_1^{(i)}, \ldots, t_{n_i}^{(i)}\}$. The post-processing step calculates, which of these leaves are to be eliminated from the match. The notations $s_j^{(i)}$ and $t_k^{(i)}$ are used to denote both leaves and their contents; the correct semantics should be clear from the context. Furthermore, $s^{(i)}$ is used both for the set $\{s_1^{(i)}, \ldots, s_{m_i}^{(i)}\}$ as well as for the source content $s_1^{(i)} \circ \ldots \circ s_{m_i}^{(i)}$ and likewise $t^{(i)}$ for the target side. The calculation of offsets may also be used (Substep S116A). The offsets function o(xy) for two contents x and y is defined as follows:

$$\mathit{off}\,\mathit{sets}(x,y) := \mathrm{argmax}_j(\mathrm{sim}(x, "y_{j+\mathit{len}(x)-1}"))$$

It returns a list of positions j for which the similarity of x with the part of y starting at position j and having length len(x) is maximal. For example, assume the matrix match had returned the slightly wrong pair $([s_1, s_2, s_3], [t_1])$. For this pair, we obtain $\mathit{off}\,\mathit{sets}(s1,t)=[\ ]$, $\mathit{off}\,\mathit{sets}(s2,t)=[0,1]$, and $\mathit{off}\,\mathit{sets}(s3,t)=[44, 45]$. If len(x)>len(y), then [0] is returned as the (only possible) offset. The post-processing (Substep S116B) may now refine the matches as follows:

1. Merge zero-similarity pairs with their neighbors (Substep S116B1).
2. Split m-n match candidates into minimal components (Substep S116B2).
   (a) For each $s_j^{(i)}$ the $\mathit{off}\,\mathit{sets}(s_j^{(i)}, t^{(i)})$ and for each $t_k^{(i)}$ the $\mathit{off}\,\mathit{sets}(t_k^{(i)}, s^{(i)})$ are calculated.
   (b) To detect split candidates, the $\mathit{off}\,\mathit{sets}(s_j^{(i)}, t^{(i)})$ are compared with the positions where the different $t_k^{(i)}$ in $t^{(i)}$ are located and vice versa.
   (c) Split candidates that are contradictory are removed and the split is performed.
3. Eliminate nonmatching leaves (Substep S116B2).
   (a) Again, start with the $\mathit{off}\,\mathit{sets}(s_j^{(i)}, t^{(i)})$ and the $\mathit{off}\,\mathit{sets}(t_k^{(i)}, s^{(i)})$. For m-1 matches, only the $\mathit{off}\,\mathit{sets}(s_j^{(i)}, t^{(i)})$ are needed, for 1-n matches only the $\mathit{off}\,\mathit{sets}(t_k^{(i)}, s^{(i)})$ are needed, for m-n matches, both are needed.
   (b) For both sides the longest possible ascending sequence is calculated. Specifically, look for $\{s_1^{(i)}, \ldots, s_{m_i}^{(i)}\}$ at the sequence of $\mathit{off}\,\mathit{sets}(s_j^{(i)}, t^{(i)})$ and detect ascending sequences of offsets. The longest ascending sequence is not identified by the length of the offset sequence, but by the lengths of the contents of the corresponding leaves. The target side is treated analogously. In the example, which is an m-1 match, it is only necessary to consider the source side. The following ascending offset lists are obtained: [0,44], [0,45], [1,44], and [1,45]. They all yield the longest ascending sequence $[s_2, s_3]$. For the target side, the longest ascending sequence is trivially $[t_1]$.
   (c) The leaves in the longest possible ascending sequences form the match. All other leaves are eliminated. In the example that would be $s_1$. Thus the combinations $([s_2, s_3], [t_1])$ and $([s_1], [\ ])$ are added to the final match. This yields the correct result.

At step S118, the matches identified in each partition 102 are added to those of the other partitions and output as the matches for the two documents 10, 12. It will be appreciated that for longer documents, the alignment may not be precisely the optimal alignment. However, the present method results in substantial savings in computational time and/or human effort.

Finally, the source and target documents may be modified to facilitate the supervised learning process (Step S120). The leaves 11, 13 of the source and/or target documents 10, 12 or the document as a whole may be annotated such that the alignment of all the leaves may be retrieved. For the target document, the modifications may include removing all unmatched leaves, as illustrated in FIG. 8. In the source document, the following modifications may be made:

1. The content 15 is rearranged so as to match the content of the target document. For an m-n match, the m source leaves are replaced by n leaves.
2. The layout attributes are modified to accommodate these changes.
3. Every leaf is annotated with an attribute 140 indicating the class of the leaf. The class is derived from the corresponding target leaf. Unmatched source leaves get a specific class: None.
4. Leaves are only removed for the purpose of rearrangement. No other source leaves are deleted.

In the subsequent structured learning process, systems and methods adopt a learning methodology which first learns the structural transformations from available examples of transformations, and then applies these transformations to a set of legacy documents.

Figure 9:
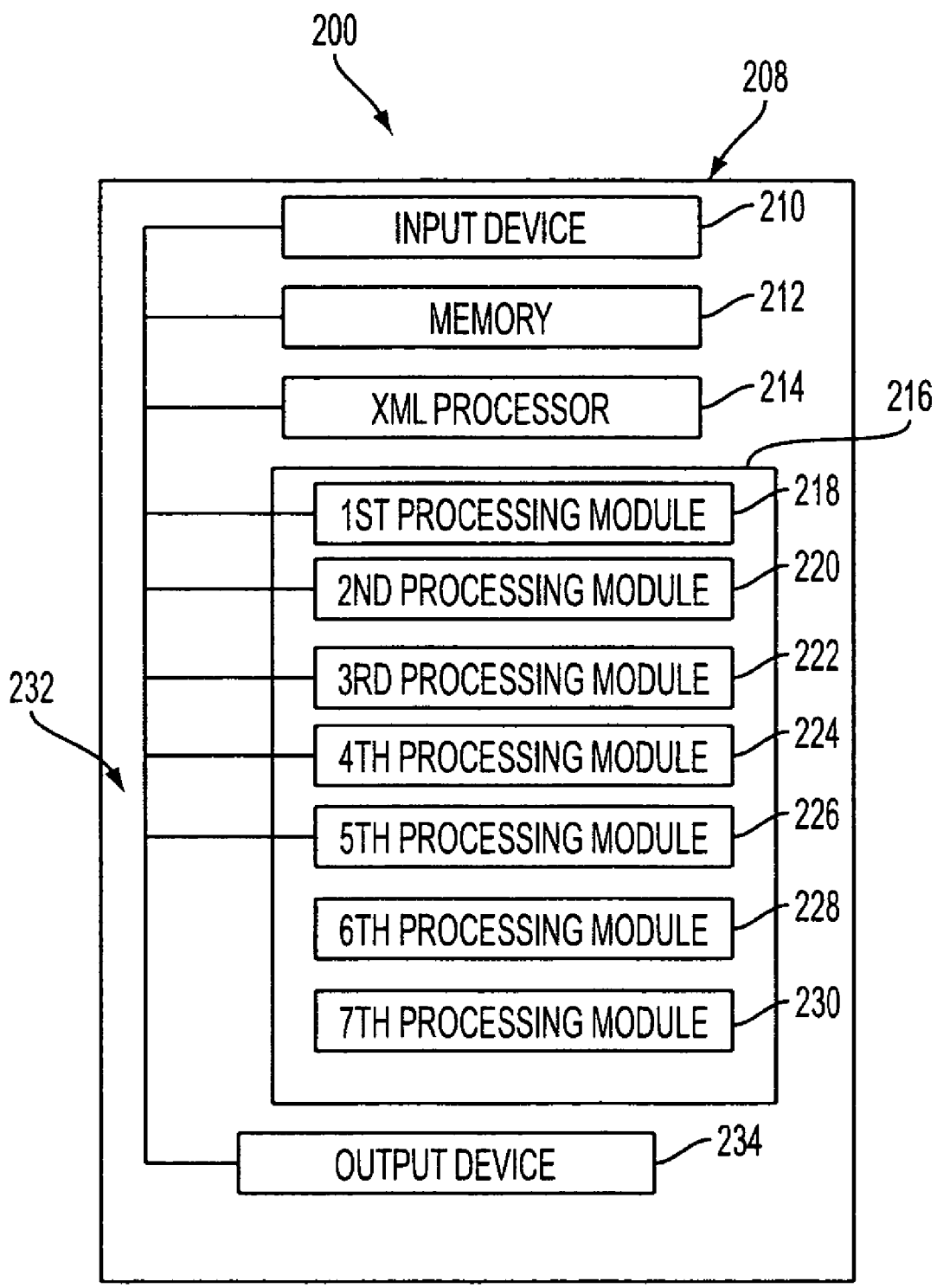
FIG. 9 is a block diagram of an exemplary processing system for performing the alignment method of FIG. 2.

FIG. 9 shows an exemplary embodiment of an alignment apparatus 200 suitable for performing the document alignment method described herein, according to one aspect of the exemplary embodiment. The exemplary alignment apparatus is in the form of a general purpose computer 208 with a number of components including an input device 210, which receives source and target documents, a memory 212, which stores input source and target documents, an XML processor 214 which identifies the leaves of the source and target documents, a processing component 216 comprising a plurality of processing modules, including a first processing module 218 which counts the number of leaves in each document and divides the leaves into k blocks, a second processing module 220, which identifies direct matches within the blocks, a third processing module 222 which partitions the document, a fourth processing module 224 which identifies (1-0), (0-1), and (1-1) matches by applying an algorithm which determines the minimum edit distance, a fifth processing module 226 which identifies candidate (1-n), (m-1), and (m-n) pairs, e.g., by identifying adjacent pairs in the traversal which have a leaf in common, a sixth processing module 228 refines the matches, e.g., by identifying probable M-N matches, a seventh processing module 230 modifies the source and target documents to make supervised learning with them more feasible, e.g., by annotating the leaves with attributes. The processing modules and other components of the computer 208 are interconnected by a bus 232. An output device 234 outputs the modified documents.

The processing modules may any suitable device, circuit, or routine that is capable of performing the functions of the respective module. Input device 210 may be any device, circuit or routine that is capable of acquiring input document data and output device 234 may be any device, circuit or routine that is capable of displaying and/or otherwise utilizing the output of any of the system components 214-230. Bus 232 may be any device, circuit or routine that is capable of providing an interconnection between the elements 210-234.

The apparatus may either run fully autonomously or enable human interaction. When human interaction is enabled, an operator may review the alignment or portions thereof and accept or reject one or more matches or select one from a plurality of candidate alignments.

An advantage of the exemplary embodiment is that it reduces processing time for generating aligned documents and provides well-aligned documents in computer readable form ready for structured learning or for other uses.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A document alignment method comprising:
   inputting source leaves of a source document in first tree structured format, the first tree structured format comprising nodes which are ultimately connected with the source leaves by paths, text content of the source document being distributed among the source leaves;
   inputting target leaves of a target document in second tree structured format, the second tree structured format comprising nodes which are ultimately connected with the target leaves by paths, text content of the target document being distributed among the target leaves;
   assigning a cost to each of a plurality of matches based on text content of the leaves, each match comprising elements selected from the group consisting of:
      a source leaf and a target leaf,
      an unmatched source leaf, and
      an unmatched target leaf;
   identifying a set of matches for which a total cost is minimal, wherein each of the input source and target leaves is in at least one of the identified matches;
   identifying, from the set of identified matches, groups of matches wherein each match in the group has a leaf in common;
   identifying, from the groups, probable matches in which more than one target leaf is matched with at least one source leaf and probable matches where more than one source leaf is matched with a target leaf;
   outputting an alignment between leaves of the target document and leaves of the source document which includes the probable matches.

2. The document alignment method of claim 1, wherein at least one of the first and second tree structured formats is an extended mark up language format.

3. The document alignment method of claim 1, wherein the target document is in a semantically richer extended mark up language format than the source document.

4. The document alignment method of claim 1, wherein each assigned cost is a function of a similarity measure for the elements in the pair.

5. A document alignment method comprising:
   inputting source leaves of a source document in first tree structured format, the first tree structured format comprising nodes which are ultimately connected with the source leaves by paths, each source leaf comprising text content;
   inputting target leaves of a target document in second tree structured format, the second tree structured format comprising nodes which are ultimately connected with the target leaves by paths, each target leaf comprising text content;
   subdividing the leaves of the source document and the leaves of the target document into blocks, each block including a set of the source leaves and a set of the target leaves;
   for each block, assigning a cost to each of a plurality of matches, each match comprising a pair of elements selected from the group consisting of a source leaf and a target leaf, an unmatched source leaf, and an unmatched target leaf from the same block;
   identifying a set of matches for which a total cost is minimal, wherein each of the input source and target leaves is in at least one of the identified matches;
   identifying, from the set of identified matches, groups of matches wherein each match in the group has a leaf in common;
   identifying, from the groups, probable matches in which more than one target leaf is matched with at least one source leaf and probable matches where more than one source leaf is matched with a target leaf; and
   outputting an alignment between leaves of the target document and leaves of the source document which includes the probable matches.

6. The document alignment method of claim 5, further comprising:
   within each of the blocks, identifying any matches wherein a similarity measure between a leaf of the source document and a leaf of the target document exceeds a threshold value; and
   subdividing the leaves of the source document and the leaves of the target document into partitions bounded by the identified matches wherein the similarity measure between the leaf of the source document and the leaf of the target document exceeds a threshold value.

7. The document alignment method of claim 1, wherein each assigned cost is a function of a similarity measure for the elements in the pair.

8. The document alignment method of claim 7, further comprising:
   determining the similarity measure for each of the matches in which a leaf of the target document is matched with a leaf of the source document, including computing at least one of:
      a length of the leaf with the shortest content minus the minimum edit distance between the two contents;

if the content of one leaf is a substring of the other one, the length of the former, otherwise 0;

a sum of the lengths of words common to the two leaves; and for each portion of the first leaf which has a matching portion in the second leaf, determining a length of the portion and summing the determined lengths, optionally modified by imposing at least one constraint whose violation leads to a similarity of 0.

9. The document alignment method of claim 7, wherein each cost is also a function of a length of a shorter of the two leaves.

10. The method of claim 1, wherein when two elements have no greater than a threshold number of characters in common, a maximum cost value is assigned.

11. The method of claim 1, wherein the identifying matches for which a total cost is minimal includes computing a minimum edit distance for a matrix in which the costs of the matches are arranged according to a sequence in which the source leaves and target leaves are arranged in their respective documents.

12. The method of claim 1, wherein the identifying of probable matches in which more than one target leaf is matched with at least one source leaf and probable matches where more than one source leaf is matched with a target leaf includes:

merging a pair of a group with another pair where the similarity between the elements of one of the pairs is 0.

13. The method of claim 1, wherein the identifying of probable matches in which more than one target leaf is matched with at least one source leaf and probable matches where more than one source leaf is matched with a target leaf includes determining whether the group as a whole has a higher similarity than the elements from which the group is derived.

14. The method of claim 1, further comprising, annotating leaves of at least one of the source document and the target document with an attribute, the attribute identifying a matching leaf from the other of the source document and the target document.

15. A supervised learning method comprising:

learning a transformation which converts a source document to a target document using source and target documents aligned by a method comprising:

inputting source leaves of a source document in first tree structured format, each source leaf comprising text content;

inputting target leaves of a target document in second tree structured format, each target leaf comprising text content;

assigning a cost to each of a plurality of matches based on leaf text content, each match consisting of one of the group consisting of:

a source leaf and a target leaf, an unmatched source leaf, and an unmatched target leaf;

identifying matches for which a total cost is minimal, wherein each of the leaves is in at least one of the identified matches;

identifying, from the identified matches, groups of matches wherein each match in the group has a leaf in common;

identifying, from the groups, probable matches in which more than one target leaf is matched with at least one source leaf and probable matches where more than one source leaf is matched with a target leaf;

outputting an alignment between leaves of the target document and leaves of the source document which includes the probable matches.

16. The method of claim 1, wherein the target document has substantially the same content as the source document.

17. The method of claim 1, wherein the source document is a natural language document and the target document is a natural language document in the same language and wherein the source and target leaves include text in the natural language.

18. A document alignment apparatus comprising:

an input device for inputting source leaves of a source document in first tree structured format, the first tree structured format comprising nodes which are ultimately connected with source leaves by paths, and inputting target leaves of a target document in second tree structured format, the second tree structured format comprising nodes which are ultimately connected with the target leaves by paths, text content of the source document being distributed among the source leaves and text content of the target document being distributed among the target leaves;

memory for storing the input source and target leaves;

a processing module which assigns a cost to each of a plurality of matches based on leaf text content and not on the tree structure of the source and target documents, each match being selected from the group consisting of:

a source leaf and a target leaf, an unmatched source leaf, and an unmatched target leaf;

a processing module which identifies matches for which a total cost is minimal, wherein each of the leaves is in at least one of the identified matches;

a processing module which identifies, from the identified matches, groups of matches wherein each match in the group has a leaf in common;

a processing module which identifies, from the groups, probable matches in which more than one target leaf is matched with at least one source leaf and probable matches where more than one source leaf is matched with a target leaf; and an output device for outputting an alignment between leaves of the target document and leaves of the source document which includes the identified probable matches.

19. The document alignment apparatus of claim 18, further comprising:

a processing module for subdividing the source and target document into blocks, each block comprising a plurality of target leaves and a plurality of target leaves.

20. The document alignment apparatus of claim 18, further comprising:

a processing module for annotating leaves of at least one of the source and target documents with attributes.

21. The method of claim 1, wherein the identifying of the set of matches for which a total cost is minimal comprises:

inputting a matrix with cost values which are a function of a measure of similarity for the content of pairs of leaves, the pairs of leaves each including a leaf of a source document and a leaf of a target document, each of the leaves including document content;

computing a minimum edit distance for the matrix based on the input cost values, whereby each leaf from the source document is aligned with a leaf of the target document or with no leaf of the target document and each leaf from the target document is aligned with a leaf of the source document or with no leaf of the source document; and from the matrix alignments, identifying candidate matches in which a leaf of at least one of the source and target documents matches a combination of leaves of the other of the source and target documents;

refining the candidate matches to identify the probable matches; and the output alignment of the leaves of the first document with the leaves of the second document includes matches of at least some of the leaves of the first document with at least some of the leaves of the second document.

22. The method of claim 21, wherein a maximum cost value is assigned to unmatched pairs in which a target leaf has no corresponding source leaf or a source leaf has no corresponding target leaf.

23. The method of claim 1, wherein each assigned cost is a function of a similarity measure for the elements in the pair and wherein each cost is also a function of a length of a shorter of the two leaves.

24. The method of claim 1, wherein the assigning a cost to each of the plurality of matches is not based on the tree structure of the source and target documents.

25. The method of claim 5, wherein the leaves of the source and target documents are subdivided into an equal number of blocks.

26. The method of claim 5, wherein the leaves of the source and target documents are subdivided into a number of blocks which is from about $1/5$ to about $1/200$ times a number of leaves in the source or target document.

* * * * *